United States Patent
Zuo et al.

(10) Patent No.: US 11,507,845 B2
(45) Date of Patent: Nov. 22, 2022

(54) HYBRID MODEL FOR DATA AUDITING

(71) Applicant: Accenture Global Solutions Limited, Dublin (IE)

(72) Inventors: Xin Zuo, Dublin (IE); Lijuan Zhou, Dublin (IE); Wei Qian, Shanghai (CN); Benjamin Duffy, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 901 days.

(21) Appl. No.: 16/212,804

(22) Filed: Dec. 7, 2018

(65) Prior Publication Data

US 2020/0184340 A1 Jun. 11, 2020

(51) Int. Cl.
*G06N 5/04* (2006.01)
*G06N 3/08* (2006.01)
*G06F 16/93* (2019.01)
*G06N 20/20* (2019.01)
*G06N 3/04* (2006.01)

(52) U.S. Cl.
CPC ............. *G06N 3/088* (2013.01); *G06F 16/93* (2019.01); *G06N 3/0427* (2013.01); *G06N 20/20* (2019.01)

(58) Field of Classification Search
CPC ...... G06N 3/00; G06N 3/02; G06N 3/08–088; G06N 5/00–048; G06N 7/00–026; G06N 20/00–20; G06Q 20/4016; G06Q 30/0185; G06Q 30/0225; G06Q 30/0248
USPC ........... 705/75, 14.26, 14.47; 706/12, 15–25, 706/45–61
See application file for complete search history.

(56) References Cited

U.S. PATENT DOCUMENTS

| | | | |
|---|---|---|---|
| 10,931,692 B1* | 2/2021 | Mota | H04L 63/1458 |
| 2005/0251406 A1* | 11/2005 | Bolt | H04M 15/47 726/23 |
| 2013/0024373 A1* | 1/2013 | Choudhuri | G06Q 30/018 705/42 |
| 2019/0228419 A1* | 7/2019 | Sampath | G06Q 99/00 |

OTHER PUBLICATIONS

Wedge et al. "Solving the 'false positives' problem in fraud prediction", Oct. 2017, arXiv:1710.07709v1.*
Sohony et al. "Ensemble Learning for Credit Card Fraud Detection", Jan. 2018, Proceedings of the ACM India Joint International Conference on Data Science and Management of Data.*

(Continued)

*Primary Examiner* — Jue Louie
(74) *Attorney, Agent, or Firm* — Fish & Richardson P.C.

(57) ABSTRACT

Implementations include processing a set of documents using an auto-encoder to provide a first sub-set of documents, the first sub-set of documents including electronic documents with a relatively high likelihood of providing true positives in an auditing process, processing a sub-set of documents using a set of auto-generated rules to provide a second sub-set of documents, the second sub-set of documents including electronic documents with a relatively high likelihood of providing false positives in an auditing process, and defining a master set of documents for the auditing process based on the sub-set of documents, the first sub-set of documents, and the second sub-set of documents, the master set of documents including at least a portion of the sub-set of documents, and at least a portion of the first sub-set of documents, and being absent the second sub-set of documents.

36 Claims, 4 Drawing Sheets

(56) References Cited

OTHER PUBLICATIONS

Randhawa et al. "Credit Card Fraud Detection Using AdaBoost and Majority Voting", Mar. 2018, IEEE Access.*
Schreyer et al. "Detection of Anomalies in Large-Scale Accounting Data using Deep Autoencoder Networks", Aug. 2018, arXiv:1709.05254v2.*

* cited by examiner

HYBRID MODEL FOR DATA AUDITING

BACKGROUND

Data sets can be audited for various reasons. For example, data sets can be audited to identify inaccuracies, and/or instances of fraud. In some cases, data sets can be relatively large, and can require a significant amount of resources to conduct auditing. In some instances, and in an effort to reduce resource consumption, a portion of a data set is selected for auditing. However, even the portion of the data set can include data that is low risk, and does not require auditing, and/or data that may produce false positives, which require additional resources to resolve. Further, data that is high risk, and should be audited, might not be included in the portion of the data set that is selected for auditing. This collectively results in an inefficient use of resources, because low risk data is audited, some data can trigger false positives, and some high risk data is unaudited.

SUMMARY

Implementations of the present disclosure are generally directed to data auditing. More particularly, implementations of the present disclosure are directed to a hybrid model for defining a data set that is to be audited.

In some implementations, actions include a processing a set of documents using an auto-encoder to provide a first sub-set of documents, the first sub-set of documents including electronic documents with a relatively high likelihood of providing true positives in an auditing process, processing a sub-set of documents using a set of auto-generated rules to provide a second sub-set of documents, the second sub-set of documents including electronic documents with a relatively high likelihood of providing false positives in an auditing process, and defining a master set of documents for the auditing process based on the sub-set of documents, the first sub-set of documents, and the second sub-set of documents, the master set of documents including at least a portion of the sub-set of documents, and at least a portion of the first sub-set of documents, and being absent the second sub-set of documents. Other implementations of this aspect include corresponding systems, apparatus, and computer programs, configured to perform the actions of the methods, encoded on computer storage devices.

These and other implementations can each optionally include one or more of the following features: the auto-encoder is trained based on documents in the set of documents; a score is determined for each document based on the auto-encoder, and documents are selected for inclusion in the first sub-set of documents based on respective scores; documents in the first sub-set of documents are prioritized; actions further include applying a set of pre-defined rules to documents in the set of documents to determine respective non-compliance scores, wherein documents in the set of documents are selected for inclusion in the sub-set of documents based on respective non-compliance scores; the sub-set of documents includes documents having potential for a determination of non-compliance in the auditing process; the auto-generated rules are provided using a random forest generated based on the set of documents; actions further include pre-processing an initial set of documents to provide the set of documents, pre-processing including one or more of adding data, renaming data, converting data, and removing data; a number of documents in the first sub-set of documents is equal to a number of documents in the second sub-set of documents; actions further comprise identifying one or more initial features in the set of documents; the auto-encoder determines one or more intermediate features based on the one or more initial features, and determines one or more reconstructed features based on the one or more intermediate features; and the auto-encoder compares the one or more reconstructed features relative to the one or more initial features to provide the first sub-set of documents.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to data auditing. More particularly, implementations of the present disclosure are directed to a hybrid model for defining a data set that is to be audited. In some implementations, actions include processing a set of documents using an auto-encoder to provide a first sub-set of documents, the first sub-set of documents including electronic documents with a relatively high likelihood of providing true positives in an auditing process, processing a sub-set of documents using a set of auto-generated rules to provide a second sub-set of documents, the second sub-set of documents including electronic documents with a relatively high likelihood of providing false positives in an auditing process, and defining a master set of documents for the auditing process based on the sub-set of documents, the first sub-set of documents, and the second sub-set of documents, the master set of documents including at least a portion of the sub-set of documents, and at least a portion of the first sub-set of documents, and being absent the second sub-set of documents.

Figure 1:
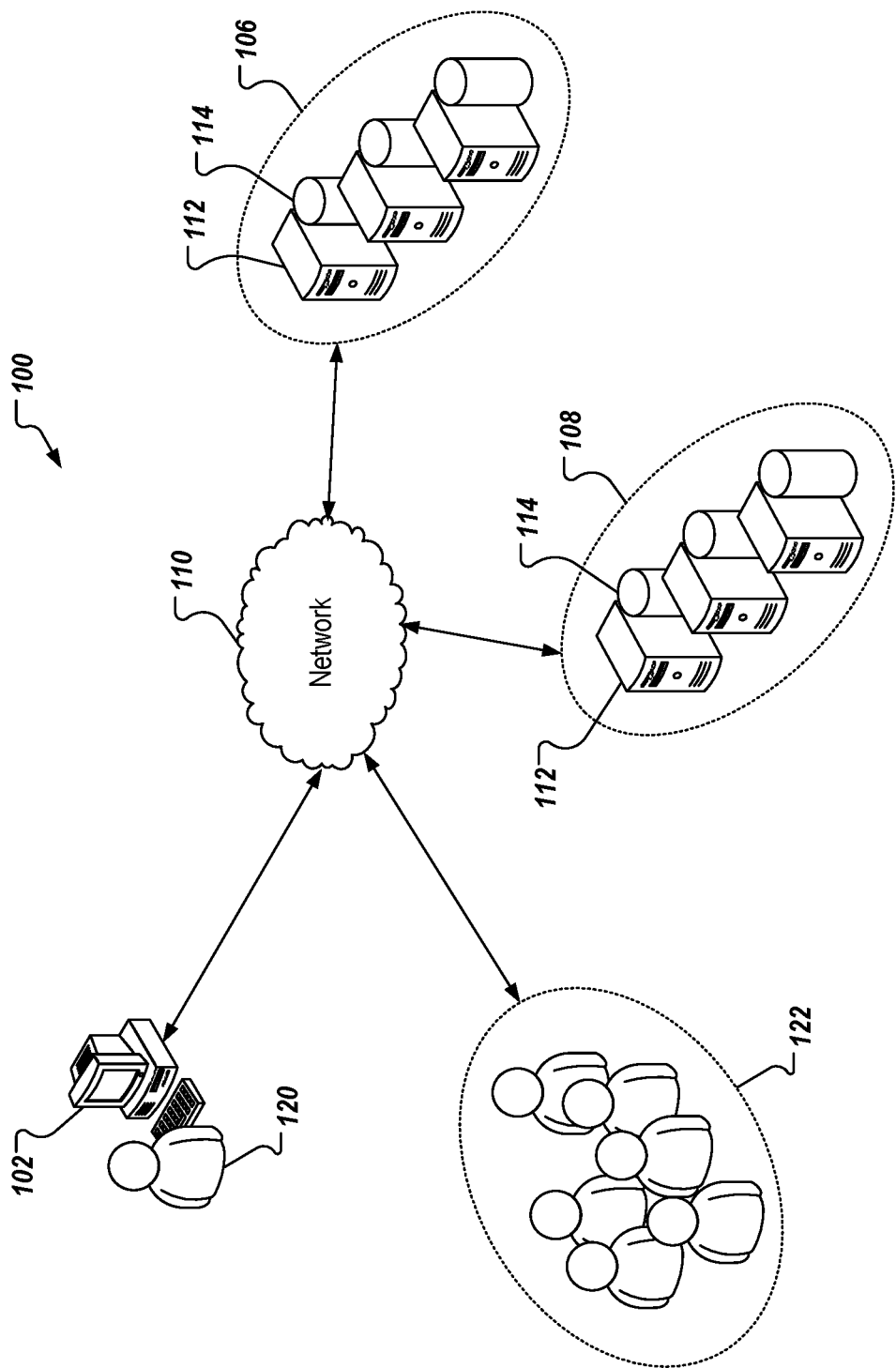
FIG. 1 depicts an example system that can execute implementations of the present disclosure.

FIG. 1 depicts an example system 100 that can execute implementations of the present disclosure. The example system 100 includes a computing device 102, back-end systems 106, 108, and a network 110. In some examples, the network 110 includes a local area network (LAN), wide area network (WAN), the Internet, or a combination thereof, and connects web sites, devices (e.g., the computing device 102), and back-end systems (e.g., the back-end systems 106, 108). In some examples, the network 110 can be accessed over a wired and/or a wireless communications link. For example, mobile computing devices, such as smartphones can utilize a cellular network to access the network 110.

In the depicted example, the back-end systems 106, 108 each include at least one server system 112, and data store 114 (e.g., database and knowledge graph structure). In some examples, the at least one server system 112 hosts one or more computer-implemented services that users can interact with using computing devices. For example, the server system 112 of the back-end system 106 can host a computer-implemented service for submitting data, and the server system 112 of the back-end system 108 can host a computer-implemented data auditing service in accordance with implementations of the present disclosure.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, a user 120 uses the computing device 102 to interact with the computer-implemented data auditing system hosted on the back-end system 108. In some examples, a group of users 122 can submit data (e.g., to the computer-implemented service for submitting data hosted on the back-end system 106), which data is to be audited. In some examples, users of the group of users 122 submit data at various times (e.g., users prepare and file electronic reports that include the data).

As described in further detail herein, the data auditing system includes a hybrid model for processing the data prior to auditing. More particularly, the computer-implemented data auditing system uses an auto-encoder for identifying potentially fraudulent data submissions, and a random forest for identifying data submissions that could result in false positives. The data auditing system adjusts a set of data that is to be audited to include the potentially fraudulent data submissions, and to exclude the data submissions that could result in false positives. In this manner, resources expended for conducting the auditing are conserved, and the set of data that is to be audited is more targeted to provide improved results.

Implementations of the present disclosure are described in further detail herein with reference to an example context. The example context includes travel and expense (T/E) reports submitted by employees of an enterprise, which are to be audited for accuracy, and/or fraud. For example, an employee generates a computer-readable, electronic T/E report, which includes data representative of T/E that the employee is requesting reimbursement for. It is contemplated, however, that implementations of the present disclosure can be realized in any appropriate context, in which data is to be audited.

Figure 2:
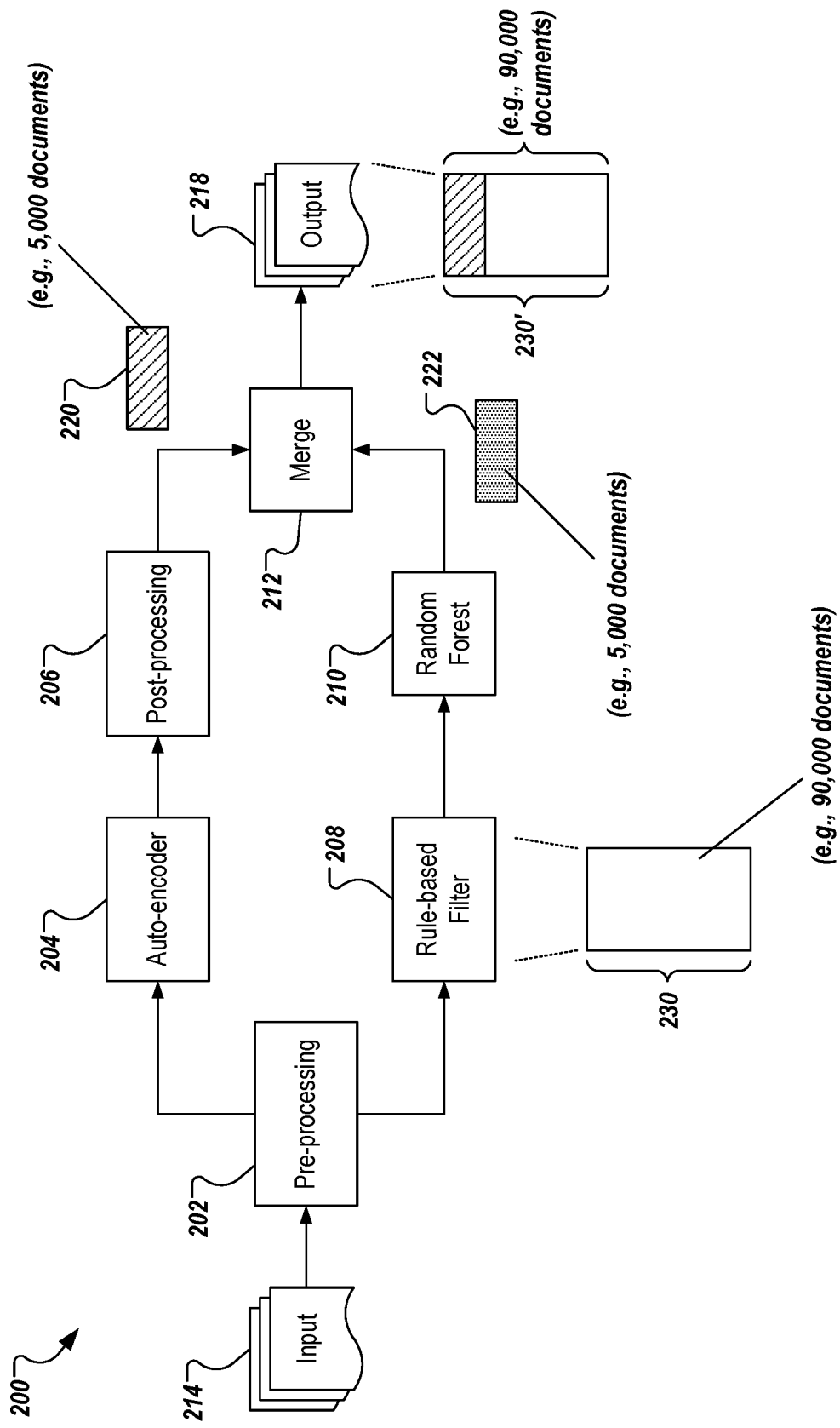
FIG. 2 depicts an example module architecture in accordance with implementations of the present disclosure.

FIG. 2 depicts an example module architecture 200 in accordance with implementations of the present disclosure. The example module architecture 200 includes a pre-processing module 202, an auto-encoder module 204, a post-processing module 206, a rule-based filter module 208, a random forest module 210, and a merge module 212. In the depicted example, a set of input documents 214 is processed through the module architecture 200 to provide a set of output documents 216.

In the example context, the set of input documents 214 can include T/E reports, provided as electronic documents, that are available for auditing. For example, the set of input documents 214 can include T/E reports for a given period (e.g., week, bi-month, month, quarter, year), and includes documents that will be selected for auditing. In the example context, the set of output documents 218 can include T/E reports, provided as electronic documents, that are to be audited. As described in further detail herein, the set of output documents 218 is absent one or more documents of the set of input documents 214 that would likely result in false positives (e.g., false indication of inaccuracy, or fraud), and includes one or more documents of the set of input documents 214 that is more likely to include true positives (e.g., true instance of inaccuracy, or fraud).

In further detail, the set of input documents 214 is pre-processed through the pre-processing module 202 to provide a pre-processed set of input documents. In some examples, pre-processing can include, but is not limited to, adding data, renaming data, converting data, and removing data. In the example context, pre-processing can include, without limitation, adding city, state/province, country information, converting a code (e.g., cost center code) into a text string (e.g., human-readable name), removing invalid expenses (e.g., expenses, for which reimbursement is not provided), removing personally identifiable information (PII), and correcting typographical errors (e.g., spell-checking).

As described in further detail herein, the pre-processed set of input documents is processed through the auto-encoder module 204, and the post-processing module 206 to provide a first sub-set of documents 220, and the pre-processed set of input documents is processed through the rule-based module 208, and the random forest module 210 to provide a second sub-set of documents 222. The first sub-set of documents 220 includes documents that are more likely to include true positives (e.g., true instance of inaccuracy, or fraud). Consequently, documents in the first sub-set of documents 220 should be audited. The second sub-set of documents 222 includes documents that, if audited, would likely result in false positives (e.g., false indication of inaccuracy, or fraud). Consequently, documents in the second sub-set of documents 222 need not be audited.

With regard to the first sub-set of documents 220, the set of pre-processed input documents is provided to the auto-encoder module 204. In some implementations, the auto-encoder module 204 applies an auto-encoder to identify documents that are likely to include true positives. An auto-encoder can be described as a multi-layer neural network that learns an encoding (representation) for a set of data, in this case, the pre-processed set of input documents. More particularly, through an unsupervised learning process, the auto-encoder learns to encode original data (e.g., the pre-processed set of input documents) from an input layer into a code, and then decode the code at an output layer to data that closely matches the original data.

Figures 3A, 3B:
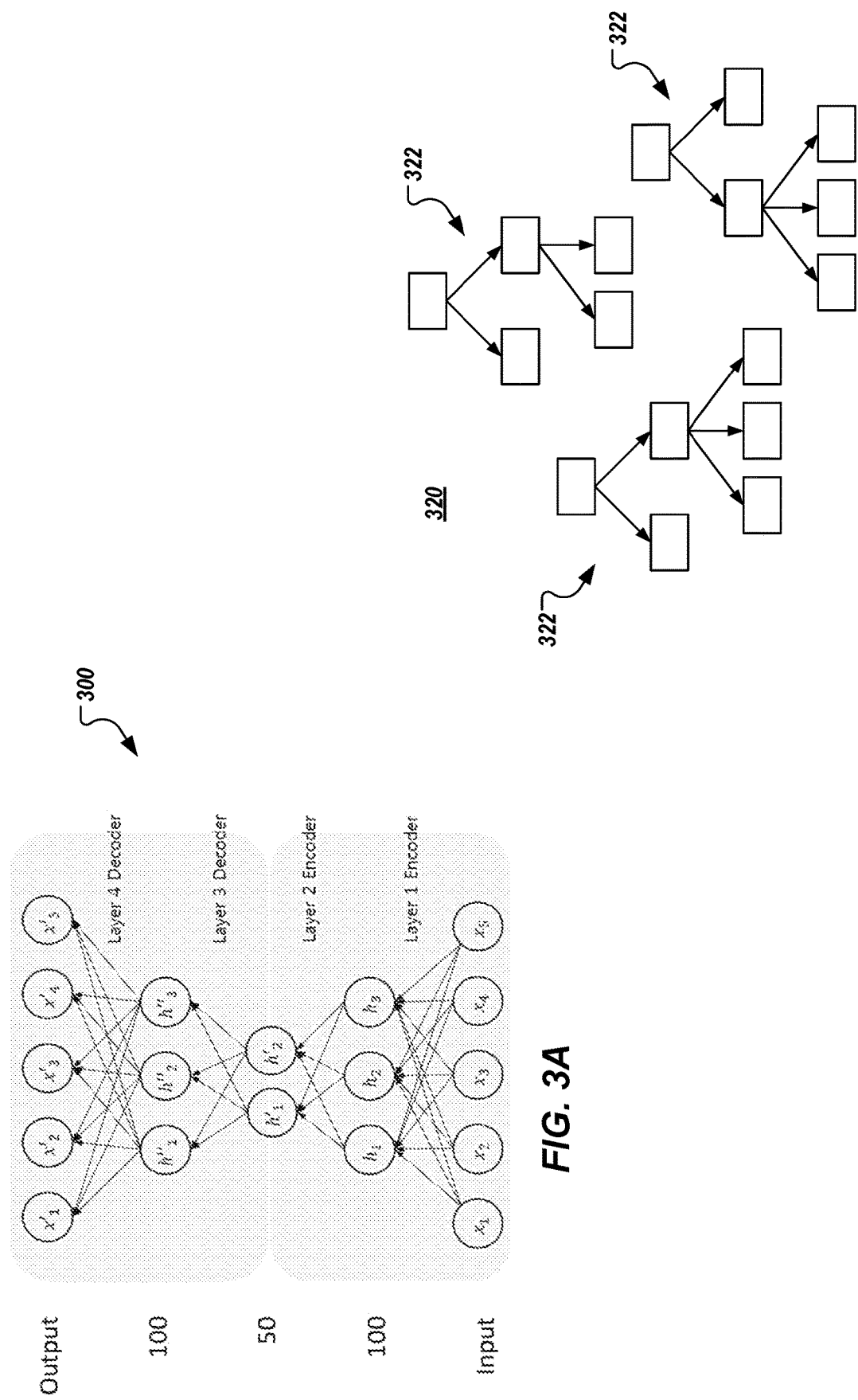
FIG. 3A depicts an example autoencoder.
FIG. 3B depicts an example random forest.

FIG. 3A depicts an example autoencoder 300. In the depicted example, the auto-encoder 300 includes five layers. It is contemplated that the auto-encoder 300 can include any appropriate number of layers. In some examples, fewer layers enable faster processing, but reduced accuracy, while more layers enable higher accuracy, but longer processing. The example layers of FIG. 3 include an input layer, a first encoding, a second encoding, a first decoding, and an output layer (second decoding).

In some examples, and as described in further detail herein, the input layer includes a set of features (e.g., 200 features) of the original input data. A first layer encoder encodes the set of features to a reduced set of features (e.g., 100 features) provided as the first encoding. A second layer encoder encodes the reduced set of features to a further reduced set of features (e.g., 50) provided as the second encoding. A first layer decoder decodes the second encoding to provide an expanded set of features (e.g., 100 features) as the first decoding. A second layer decoder decodes the expanded set of features to provide a further expanded set of features (e.g., 200 features) provided as the second decoding.

In some examples, the aim of the auto-encoder 300 is to generate the output (e.g., the second encoding) to be as close as possible to the input (e.g., the original data). In some examples, the closeness of the output to the input is quantified based on a loss function. An example loss function includes, without limitation, mean-squared error (MSE), which is the sum of squared distances between the input values, and the output values. It is contemplated, however, that any appropriate loss function can be used. In some examples, the auto-encoder 300 is repeatedly trained, in an unsupervised learning process, to minimize the loss function (e.g., get the output within a threshold distance of the input).

In short, the auto-encoder 300 defines a model with the best set of neural network settings (e.g., based on the loss function) that are generated by parameter tuning. The training process of the auto-encoder reduces the number of features (encoding), and increases the number of features (decoding) using autoencoding to create a reconstructed features (e.g., the output).

Referring again to FIG. 2, the auto-encoder module 204 processes the pre-processed set of input documents to identify a set of features in the data. In the example context, example features can include, without limitation, amount of expense, name of submitter, location(s) of travel, and types of expenses. In some examples, set of features can be enriched with additional data from one or more data sources to provide an enriched set of features. For example, and in the example context, a credit profile, and an average expense amount can be provided for each user submitting a T/E report. This additional data can be retrieved, for example, from user profiles maintained for the users. Accordingly, the enriched set of features includes original data (e.g., from the T/E reports), and additional data (e.g., from other sources).

In some implementations, the set of features (or enriched set of features) of a document is ingested into the trained auto-encoder (e.g., the model) processed by the auto-encoder module 204. The auto-encoder module 204 compares the reconstructed features (output layer) relative to the original features (input layer). In some implementations, potential instances of inaccuracy, or fraud in a document are identified based on the comparison using MSE. For example, an MSE value can be determined for each document, and the documents can be ranked based on respective MSE scores (e.g., highest to lowest). In some examples, higher MSE values can indicate potential instances of inaccuracy, or fraud. In some examples, a top number of documents based on MSE values is selected, and provided as a suspect set of documents.

In some implementations, the auto-encoder module 204 provides the suspect set of documents to the post-processing module 206. In some examples, the post-processing module 206 prioritizes the documents in the suspect set of documents (e.g., re-ranks the documents). In some examples, prioritizing of the documents can be based on one or more rules. In the example context, example rules can consider, without limitation, the MSE values, the expense amount, and types of expenses. For example, a first document can include a first MSE value, and a first expense amount, and a second document can include a second MSE value, and a second expense amount. In this example, the first MSE value is greater than the second MSE value, and the first expense amount is less than the second expense amount. In this example, the suspect set of documents can include the first document being ranked higher than the second document based on respective MSE values. however, the post-processing module 206 can prioritize the documents, making the second document a higher priority than the first document. That is, for example, because the second amount is greater than the first amount the second document is now ranked higher than the first document.

Accordingly, the post-processing module 206 provides the a first sub-set of documents 220. As described herein, the first sub-set of documents 220 includes documents that are more likely to include true positives (e.g., true instance of inaccuracy, or fraud), and are prioritized based on one or more factors (e.g., MSE values, expense amounts, types of expenses). In this manner, the first sub-set of documents 220 provides documents that should be the subject of auditing, and in a priority for auditing.

With regard to the second sub-set of documents 222, the set of pre-processed input documents is provided to the rule-based filter module 208. The rule-based filter module 208 processes the set of pre-processed input documents to filter out a sub-set of documents. In some examples, filtering is based on a set of rules that are applied to determine whether each document is compliant. In the example context, rules in the set of rules test for compliance with expense report submission requirements. In some examples, the set of rules can be described as pre-defined rules that are provided based on logic, and/or experience. In the example context, example rules can include, without limitation, multiples of the same types of expenses (e.g., hotel rooms, dinners) on the same date indicates non-compliance, and an expense exceeding a threshold amount in a particular location (e.g., city, country) indicates non-compliance.

In some examples, a non-compliance score can be determined for each document based on the rules. A sub-set of documents 230 can be defined based on respective non-compliance scores. For example, documents can be ranked based on non-compliance score, documents with higher non-compliance scores being ranked higher. In some examples a top Z, or a top X % of documents can be selected, and included in the sub-set of documents 230. For example, the set of pre-processed input documents can include 900,000 documents, and the top 10% (e.g., X=10), based on non-compliance score can be selected (e.g., 90,000 documents) for inclusion in the sub-set of documents 230.

The sub-set of documents 230 include documents that should be audited. However, and as introduced above, the sub-set of documents 230 can include documents that may result in false positives. Accordingly, if documents that may result in false positives are included in auditing, resources would be wasted in auditing such documents. Consequently, and as described in further detail herein, implementations of the present disclosure identify documents that may result in false positives, and remove at least a portion of such documents from the sub-set of documents 230.

In some implementations, the sub-set of documents 230 is provided as input to the random forest module 230 to determine the second sub-set of documents 222. That is, and as described in further detail herein, the random forest module 230 processes the sub-set of documents 230 to identify documents that are likely to result in false positives, and include at least a portion of such documents in the sub-set of documents 222. The random forest module 230 implements random forest to provide a set of auto-generated rules for compliance based on the documents in the sub-set of documents 230.

In some examples, random forest can be described as a supervised learning algorithm. In general, random forest randomly generates multiple decision trees based on attributes of the documents in the sub-set of documents 230. That is, the forest is a set of decision trees that are trained. FIG. 3B depicts an example random forest 320. In the depicted example, the example random forest 320 includes multiple decision trees 322. The example random forest 320 is relatively simple, and it is contemplated that the random forest 320 can include any appropriate number of decision trees 322. Further, each decision tree 322 is relatively simple, and it is contemplated that the decision trees can include varying degrees of complexity (e.g., more intermediate nodes, more leaf nodes). In general, the random forest averages multiple decision trees that are trained on different parts of the same training set with the goal of reducing variance between outputs of the decision trees.

In some implementations, each document in the sub-set of documents 230 is processed through the random forest (through the auto-generated rules of the random forest), and a compliance score is determined. The second sub-set of documents 222 can be defined based on respective compliance scores. For example, documents can be ranked based on compliance score, documents with higher compliance scores being ranked higher (e.g., rank from high to low). In some examples a top Y, or a top Q % of documents can be selected, and included in the second sub-set of documents 222. That is, the second sub-set of documents 222 includes the top Y, or a top Q % of documents. For example, the sub-set of documents 230 can include 90,000 documents, and the top 5,000 (e.g., Y=5,000) are selected based on compliance scores.

In some implementations, the merge module 212 adds the first sub-set of documents 220 to the sub-set of documents 230, and removes the second sub-set of documents 222 from the sub-set of documents 230 to provide a master set of documents 231'. In this manner, at least a portion of the first sub-set of documents 220 replaces at least a portion of the second sub-set of documents. That is, documents that would likely result in false positives, are replaced with documents that would likely result in true positives. Accordingly, the master set of documents 203' is tuned to provide improved auditing results, and more efficient use of resources (e.g., resources are being used on more promising documents, and not wasted on less promising documents).

In some implementations, the number of documents in the first sub-set of documents 220 is equal to the number of documents in the second sub-set of documents 222. In this manner, the number of documents in the master set of documents 230' is equal to the number of documents in the sub-set of documents 230. In some implementations, provisioning of the first sub-set of documents 220, and the second sub-set of documents 222 occurs in parallel. In some implementations, provisioning of the first sub-set of documents 220, and the second sub-set of documents 222 occurs in sequence (e.g., the first sub-set of documents 220 is determined, then the second sub-set of documents 222 is determined; the second sub-set of documents 222 is determined, then the first sub-set of documents 220 is determined).

Figure 4:
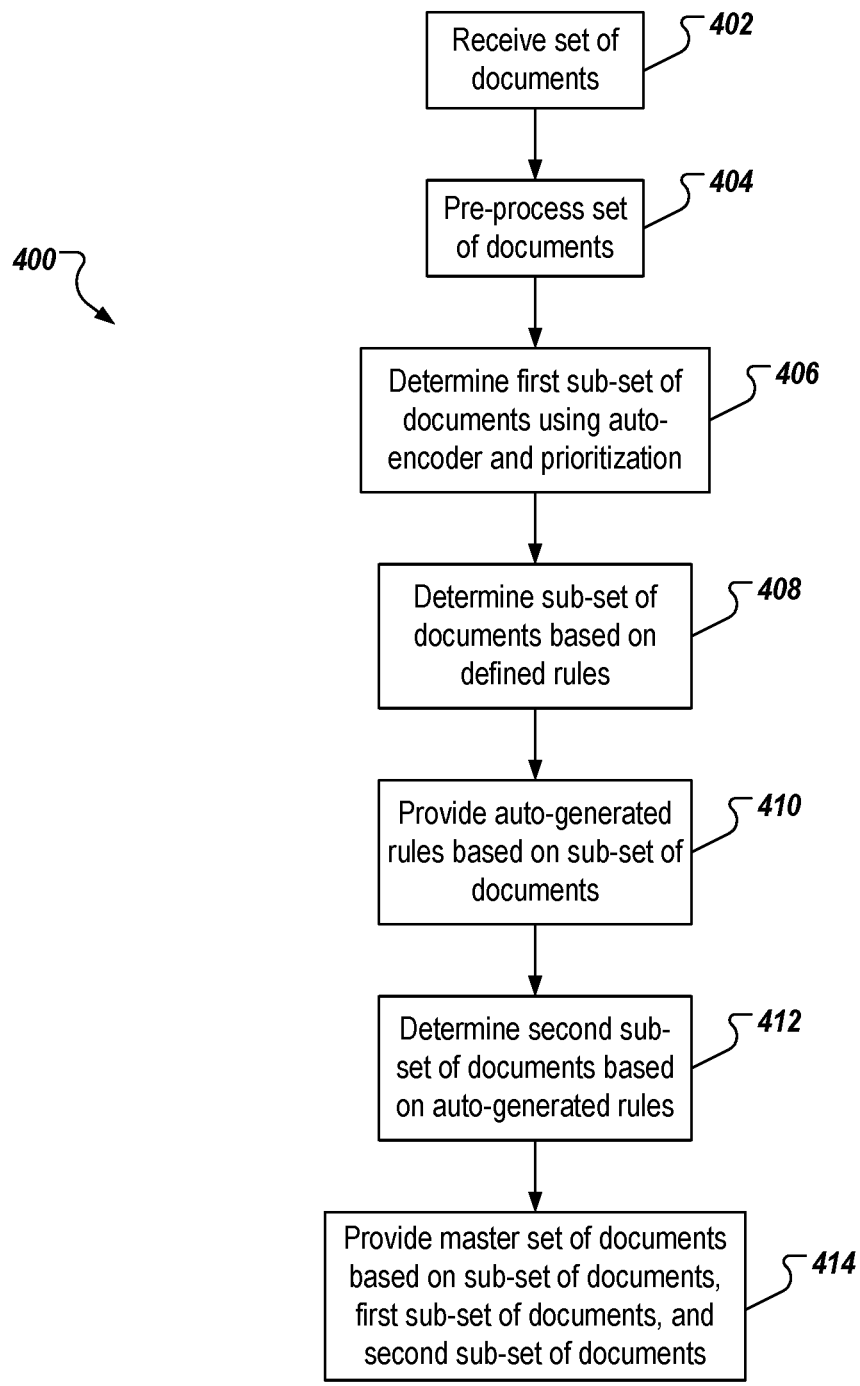
FIG. 4 depicts an example process that can be executed in implementations of the present disclosure.

FIG. 4 depicts an example process 400 that can be executed in implementations of the present disclosure. In some examples, the example process 400 is provided using one or more computer-executable programs executed by one or more computing devices (e.g., the back-end system 108 of FIG. 1).

A set of documents is received (402). For example, the pre-processing module 202 of FIG. 2 receives the set of input documents 214. Each document in the set of input documents 214 is provided as an electronic document. The set of documents is pre-processed (404). For example, the pre-processing module 202 pre-processes the set of input documents 214 to provide a pre-processed set of input documents. As described herein, pre-processing can include, but is not limited to, adding data, renaming data, converting data, and removing data.

A first sub-set of documents is determined (406). For example, and as described herein, the auto-encoder module 204 trains an auto-encoder (e.g., the auto-encoder 300 of FIG. 3) using at least a portion of the documents included in the pre-processed set of documents. In some examples, the auto-encoder is trained based on an enriched set of features including original data from documents in the pre-processed set of documents, and additional data from one or more other sources. In some examples, and as described herein, the set of features (or enriched set of features) of a document is ingested into the trained auto-encoder (e.g., the model) processed by the auto-encoder module 204, compares the reconstructed features (output layer) relative to the original features (input layer) to provide an MSE value for each document. The documents can be ranked based on respective MSE scores and, a top number of documents based on MSE values is selected, and provided as a suspect set of documents. The suspect set of documents to the post-processing module 206, which prioritizes the documents in the suspect set of documents, and provides the a first sub-set of documents 220. As described herein, the first sub-set of documents 220 includes documents that are more likely to include true positives.

A sub-set of documents is determined (408). For example, the rule-based filter module 208 processes the set of pre-processed input documents to provide the sub-set of documents 230. In some examples, the rules are pre-defined rules. Auto-generated rules are provided (410). For example, and as described herein, the random forest module 230 implements random forest to provide a set of auto-generated rules for compliance based on the documents in the sub-set of documents 230. A second sub-set of documents is determined (412). For example, and as described herein, each document in the sub-set of documents 230 is processed through the random forest (through the auto-generated rules of the random forest), and a compliance score is determined, the second sub-set of documents 222 being defined based on respective compliance scores. A master set of documents is provided (414). For example, and as described herein, the merge module 212 adds the first sub-set of documents 220 to the sub-set of documents 230, and removes the second sub-set of documents 222 from the sub-set of documents 230 to provide the master set of documents 231'.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method executed by one or more processors, the method comprising:
processing a set of documents using an auto-encoder to provide a first sub-set of documents, the first sub-set of documents comprising electronic documents with a relatively high likelihood of providing true positives in an auditing process, the auto-encoder being trained based on an enriched set of features including original data from the set of documents and additional data;
filtering the set of documents to provide a sub-set of documents based on a set of pre-defined rules, documents in the sub-set of the documents being determined to be audited based on the pre-defined rules;
processing the sub-set of documents using a set of auto-generated rules to provide a second sub-set of documents, the second sub-set of documents comprising electronic documents with a relatively high likelihood of providing false positives in an auditing process, the set of auto-generated rules comprising a plurality of decision trees generated based on the documents in the sub-set of the documents; and
defining, by the one or more processors, a master set of documents for the auditing process based on the sub-set of documents, the first sub-set of documents, and the second sub-set of documents, the master set of documents including at least a portion of the sub-set of documents, and at least a portion of the first sub-set of documents, and being absent the second sub-set of documents.

2. The method of claim 1, wherein the auto-encoder is trained based on documents in the set of documents.

3. The method of claim 1, wherein a score is determined for each document based on the auto-encoder, and documents are selected for inclusion in the first sub-set of documents based on respective scores.

4. The method of claim 1, wherein documents in the first sub-set of documents are prioritized.

5. The method of claim 1, further comprising applying a set of pre-defined rules to documents in the set of documents to determine respective non-compliance scores, wherein documents in the set of documents are selected for inclusion in the sub-set of documents based on respective non-compliance scores.

6. The method of claim 1, wherein the sub-set of documents includes documents having potential for a determination of non-compliance in the auditing process.

7. The method of claim 1, wherein the auto-generated rules are provided using a random forest generated based on the set of documents.

8. The method of claim 1, further comprising pre-processing an initial set of documents to provide the set of documents, pre-processing comprising one or more of adding data, renaming data, converting data, and removing data.

9. The method of claim 1, wherein a number of documents in the first sub-set of documents is equal to a number of documents in the second sub-set of documents.

10. The method of claim 1, further comprising identifying one or more initial features in the set of documents.

11. The method of claim 10, wherein the auto-encoder determines one or more intermediate features based on the one or more initial features, and determines one or more reconstructed features based on the one or more intermediate features.

12. The method of claim 11, wherein the auto-encoder compares the one or more reconstructed features relative to the one or more initial features to provide the first sub-set of documents.

13. A non-transitory computer-readable storage medium coupled to one or more processors and having instructions stored thereon which, when executed by the one or more processors, cause the one or more processors to perform operations comprising:
processing a set of documents using an auto-encoder to provide a first sub-set of documents, the first sub-set of documents comprising electronic documents with a relatively high likelihood of providing true positives in an auditing process, the auto-encoder being trained based on an enriched set of features including original data from the set of documents and additional data;
filtering the set of documents to provide a sub-set of documents based on a set of pre-defined rules, documents in the sub-set of the documents being determined to be audited based on the pre-defined rules;
processing the sub-set of documents using a set of auto-generated rules to provide a second sub-set of documents, the second sub-set of documents comprising electronic documents with a relatively high likelihood of providing false positives in an auditing process, the set of auto-generated rules comprising a plurality of decision trees generated based on the documents in the sub-set of the documents; and
defining a master set of documents for the auditing process based on the sub-set of documents, the first sub-set of documents, and the second sub-set of documents, the master set of documents including at least a portion of the sub-set of documents, and at least a portion of the first sub-set of documents, and being absent the second sub-set of documents.

14. The computer-readable storage medium of claim 13, wherein the auto-encoder is trained based on documents in the set of documents.

15. The computer-readable storage medium of claim 13, wherein a score is determined for each document based on the auto-encoder, and documents are selected for inclusion in the first sub-set of documents based on respective scores.

16. The computer-readable storage medium of claim 13, wherein documents in the first sub-set of documents are prioritized.

17. The computer-readable storage medium of claim 13, wherein operations further comprise applying a set of pre-defined rules to documents in the set of documents to determine respective non-compliance scores, wherein documents in the set of documents are selected for inclusion in the sub-set of documents based on respective non-compliance scores.

18. The computer-readable storage medium of claim 13, wherein the sub-set of documents includes documents having potential for a determination of non-compliance in the auditing process.

19. The computer-readable storage medium of claim 13, wherein the auto-generated rules are provided using a random forest generated based on the set of documents.

20. The computer-readable storage medium of claim 13, wherein operations further comprise pre-processing an initial set of documents to provide the set of documents, pre-processing comprising one or more of adding data, renaming data, converting data, and removing data.

21. The computer-readable storage medium of claim 13, wherein a number of documents in the first sub-set of documents is equal to a number of documents in the second sub-set of documents.

22. The computer-readable storage medium of claim 13, wherein operations further comprise identifying one or more initial features in the set of documents.

23. The computer-readable storage medium of claim 22, wherein the auto-encoder determines one or more intermediate features based on the one or more initial features, and determines one or more reconstructed features based on the one or more intermediate features.

24. The computer-readable storage medium of claim 23, wherein the auto-encoder compares the one or more reconstructed features relative to the one or more initial features to provide the first sub-set of documents.

25. A system, comprising:
one or more processors; and
a computer-readable storage device coupled to the one or more processors and having instructions stored thereon which, when executed by the one or more processors, cause the one or more processors to perform operations comprising:
processing a set of documents using an auto-encoder to provide a first sub-set of documents, the first sub-set of documents comprising electronic documents with a relatively high likelihood of providing true positives in an auditing process, the auto-encoder being trained based on an enriched set of features including original data from the set of documents and additional data;
filtering the set of documents to provide a sub-set of documents based on a set of pre-defined rules, documents in the sub-set of the documents being determined to be audited based on the pre-defined rules;
processing the sub-set of documents using a set of auto-generated rules to provide a second sub-set of documents, the second sub-set of documents comprising electronic documents with a relatively high likelihood of providing false positives in an auditing process, the set of auto-generated rules comprising a plurality of decision trees generated based on the documents in the sub-set of the documents; and
defining a master set of documents for the auditing process based on the sub-set of documents, the first sub-set of documents, and the second sub-set of documents, the master set of documents including at least a portion of the sub-set of documents, and at least a portion of the first sub-set of documents, and being absent the second sub-set of documents.

26. The system of claim 25, wherein the auto-encoder is trained based on documents in the set of documents.

27. The system of claim 25, wherein a score is determined for each document based on the auto-encoder, and documents are selected for inclusion in the first sub-set of documents based on respective scores.

28. The system of claim 25, wherein documents in the first sub-set of documents are prioritized.

29. The system of claim 25, wherein operations further comprise applying a set of pre-defined rules to documents in the set of documents to determine respective non-compliance scores, wherein documents in the set of documents are selected for inclusion in the sub-set of documents based on respective non-compliance scores.

30. The system of claim 25, wherein the sub-set of documents includes documents having potential for a determination of non-compliance in the auditing process.

31. The system of claim 25, wherein the auto-generated rules are provided using a random forest generated based on the set of documents.

32. The system of claim 25, wherein operations further comprise pre-processing an initial set of documents to provide the set of documents, pre-processing comprising one or more of adding data, renaming data, converting data, and removing data.

33. The system of claim 25, wherein a number of documents in the first sub-set of documents is equal to a number of documents in the second sub-set of documents.

34. The system of claim 25, wherein operations further comprise identifying one or more initial features in the set of documents.

35. The system of claim 34, wherein the auto-encoder determines one or more intermediate features based on the one or more initial features, and determines one or more reconstructed features based on the one or more intermediate features.

36. The system of claim 35, wherein the auto-encoder compares the one or more reconstructed features relative to the one or more initial features to provide the first sub-set of documents.

* * * * *